(12) United States Patent
Pierce et al.

(10) Patent No.: US 10,916,042 B2
(45) Date of Patent: Feb. 9, 2021

(54) METHODS AND DEVICES FOR CAPTURING HEURISTIC INFORMATION VIA A RELATIONSHIP TOOL

(71) Applicant: DecisionNext, Inc., San Francisco, CA (US)

(72) Inventors: Robert David Pierce, Berkeley, CA (US); David Rodriguez Gomez, Redwood City, CA (US); Arden Martin Arnold, San Francisco, CA (US); Michael R. Neal, San Francisco, CA (US)

(73) Assignee: DECISIONNEXT, INC., San Francisco, CA (US)

(*) Notice: Subject to any disclaimer, the term of this patent is extended or adjusted under 35 U.S.C. 154(b) by 0 days.

(21) Appl. No.: 16/299,357

(22) Filed: Mar. 12, 2019

(65) Prior Publication Data
US 2020/0294291 A1    Sep. 17, 2020

(51) Int. Cl.
*G06T 11/20* (2006.01)
*G06T 11/60* (2006.01)

(52) U.S. Cl.
CPC ............ *G06T 11/206* (2013.01); *G06T 11/60* (2013.01)

(58) Field of Classification Search
CPC ................................ G06T 11/206; G06T 11/60
See application file for complete search history.

(56) References Cited

U.S. PATENT DOCUMENTS

| | | | | |
|---|---|---|---|---|
| 2005/0197806 A1* | 9/2005 | Eryurek | ............. | G05B 23/0221 702/188 |
| 2008/0192069 A1* | 8/2008 | Wanzke | .................. | G06F 17/18 345/619 |
| 2010/0191790 A1* | 7/2010 | Kincaid | .................. | G06F 17/15 708/274 |
| 2011/0066997 A1* | 3/2011 | O'Riordan | .......... | G06F 30/3323 716/136 |

* cited by examiner

*Primary Examiner* — Sing-Wai Wu
(74) *Attorney, Agent, or Firm* — Fernando & Partners, LLP

(57) ABSTRACT

In accordance with various embodiments, a method is performed at an electronic device including a display device and one or more input devices. The method includes displaying, on the display device, a first graphing area presenting a plot of a first set of data points for a first variable versus a first set of data points for a second variable. The method includes displaying, on the display device, an indication of a relationship between the first variable and the second variable. The method includes detecting, via the one or more input devices, a user input indicative of change to the relationship between the first variable and the second variable. The method includes determining, based on the changed relationship between the first variable and the second variable, a second set of data points. The method includes displaying, on the display device, a second graphing area presenting a plot of the second set of data points.

16 Claims, 16 Drawing Sheets

METHODS AND DEVICES FOR CAPTURING HEURISTIC INFORMATION VIA A RELATIONSHIP TOOL

TECHNICAL FIELD

The present disclosure generally relates generally to user interfaces for manipulating data.

BACKGROUND

When modeling a multi-variate system, data can be obtained from a number of different sources in a number of different forms. This data can be used to generate predicted data based on one or more models. However, it is difficult to integrate expert heuristic information (based on their expertise or proprietary information) into the modeling.

BRIEF DESCRIPTION OF THE DRAWINGS

For a better understanding of aspects of the various embodiments described herein and to show more clearly how they may be carried into effect, reference is made, by way of example only, to the accompanying drawings.

Figure 1:
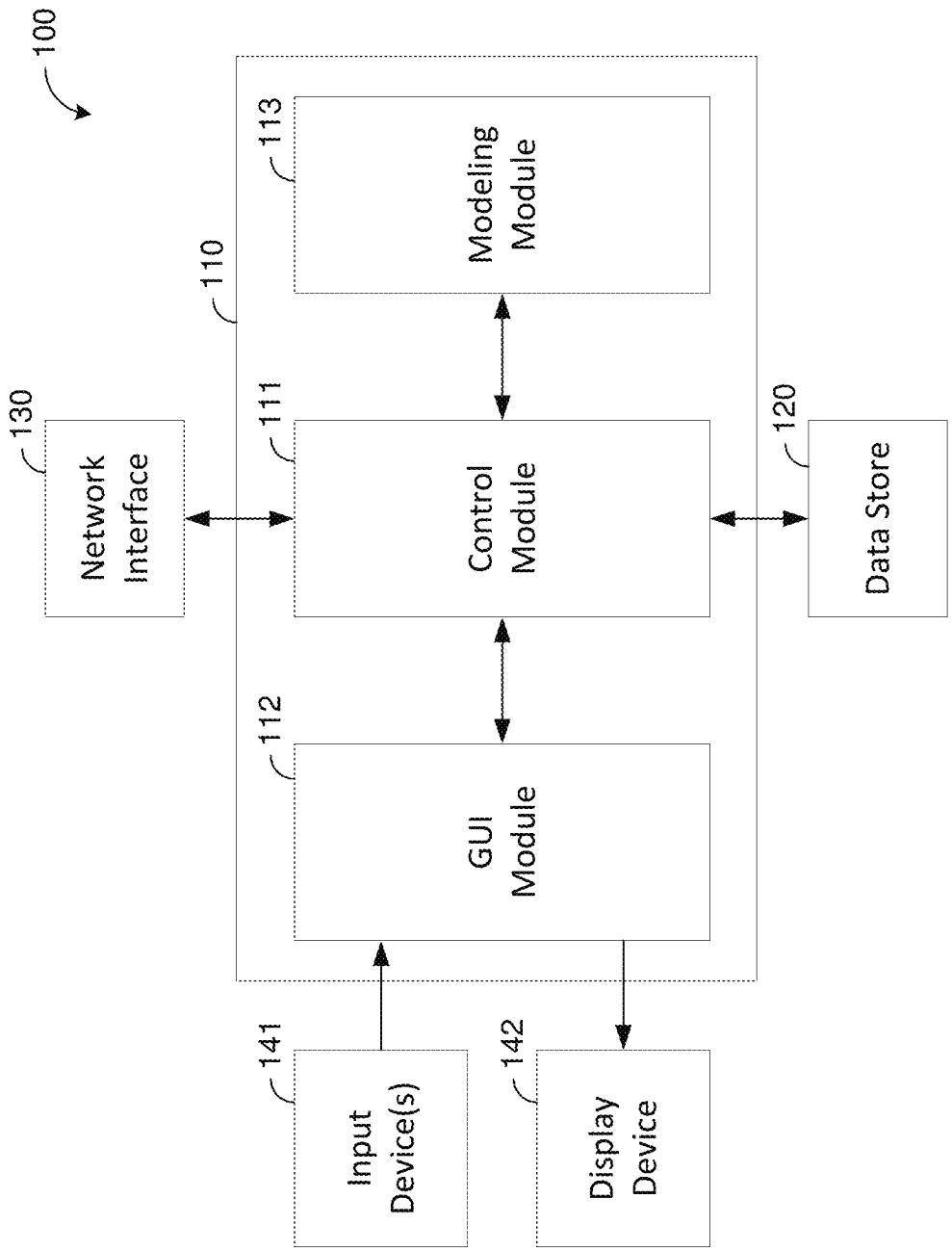
FIG. 1 is a block diagram of a modeling system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein include devices, systems, and methods for displaying modeled data. In various embodiments, a method performed at an electronic device including a display device and one or more input devices includes displaying, on the display device, a first graphing area presenting a plot of a first set of data points for a first variable versus a first set of data points for a second variable. The method includes displaying, on the display device, an indication of a relationship between the first variable and the second variable. The method includes detecting, via the one or more input devices, a user input indicative of change to the relationship between the first variable and the second variable. The method includes determining, based on the changed relationship between the first variable and the second variable, a second set of data points. The method includes displaying, on the display device, a second graphing area presenting a plot of the second set of data points.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

As noted above, a modeling system can use data obtained from a number of different sources in a number of different formats to generate predicted data based on one or more models. In general, the accuracy of the model increases when more data is provided to system. However, it is difficult to integrate expert heuristic information from a user (e.g., data based on the user's expertise or proprietary information otherwise unavailable) into the modeling. To that end, in various implementations, a number of user interface enhancements are provided as an efficient mechanism for capturing the expert heuristic information.

For example, a biometric modeling system can obtain calorie expenditure data from a wearable device (such as a smartwatch), obtain calorie intake data input via a calorie-counting application, and, using one or more biometric models, generate modeled data regarding body size. In various implementations, a user interface enhancement is provided that allows a user to efficiently provide information regarding future calorie expenditure or calorie intake (e.g., based on user knowledge that cannot otherwise be efficiently captured) and see the future effect on body size. In various implementations, a user interface enhancement is provided that allows a user to change the weighting of particular data points used in the one or more models. For example, knowing that calorie expenditure data for a particular month was unusually high or calorie intake data for a particular month was unusually low, a user interface enhancement is provided that allows the user to lower the modeling weights for data points corresponding to that particular month and see the effect on body size. In various implementations, the one or more models calculate a relationship between variables (e.g., a covariance between the calorie expenditure data and the calorie intake data). In various implementations, a user interface enhancement is provided that allows a user to efficiently provide information regarding this relationship. For example, knowing that calorie expenditure is more dependent on calorie intake than the model deduces based on the obtained data, the user can efficiently change the covariance used in calculating body size.

As another example, a climate modeling system can obtain $CO_2$-level data from a freely-available online source, obtain sea surface temperature data from a weather satellite, and, using one or more climate models, generate modeled data regarding glacial ice amounts. In various implementations, a user interface enhancement is provided that allows a user to efficiently provide information regarding future $CO_2$ levels or sea surface temperature and see the future effect on glacial ice amounts. In various implementations, a user interface enhancement is provided that allows a user to change the weighting in the one or more models of particular data points. For example, predicting that sea surface temperature in future years will more likely track that in a particular previous year, a user interface enhancement is provided that allows the user to increase the modeling weights for data points corresponding to that particular year and see the effect on glacial ice amounts. In various implementations, the one or more models calculate a relationship between variables (e.g., a covariance between the $CO_2$-level data and the sea surface temperature data). In various implementations, a user interface enhancement is provided that allows a user to efficiently provide information regarding this relationship. For example, knowing that sea surface temperature is less dependent on $CO_2$ levels than the model deduces based on the obtained data, the user can efficiently change the covariance used in calculating glacial ice amounts.

FIG. 1 illustrates a modeling system 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the modeling system 100 includes a processor 110 coupled to a data store 120, a network interface 130, one or more input devices 141, and a display device 142. The processor 110 includes a control module 111, a graphical user interface (GUI) module 112, and a modelling module 113.

In various implementations, the data store 120 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. In various implementations, the data store 120 stores modeling data input obtained via the one or more input devices 141 or via the network interface 130 (e.g., from a private or public network, such as the Internet). In various implementations, modeling data is obtained in various ways. For example, in various implementations, the modeling data is obtained via the network interface from one or more online sources. As another example, in various implementations, the modeling data is obtained via the one or more input devices 141, either automatically or manually input by a user.

The modeling module 113 generates modeled data based on the modeling data and one or more models. In various implementations, the one or more models include functional relationships between two or more variables. In various implementations, the models includes a Markov Chain based model, e.g., a Markov regression model. In various implementations, the models include a Monte Carlo based model.

The GUI module presents the modeling data and/or the modeled data in a graphical user interface via the display device 142 and the one or more input devices 141.

The control module 111 coordinates the various elements of the modeling system 100 to achieve the functions described above and further below.

FIGS. 2A-2M illustrate example user interfaces for displaying modeled data in accordance with some embodiments. The user interfaces in these figures are used to illustrate the processes described below, including the process in FIG. 3.

Figure 2A:
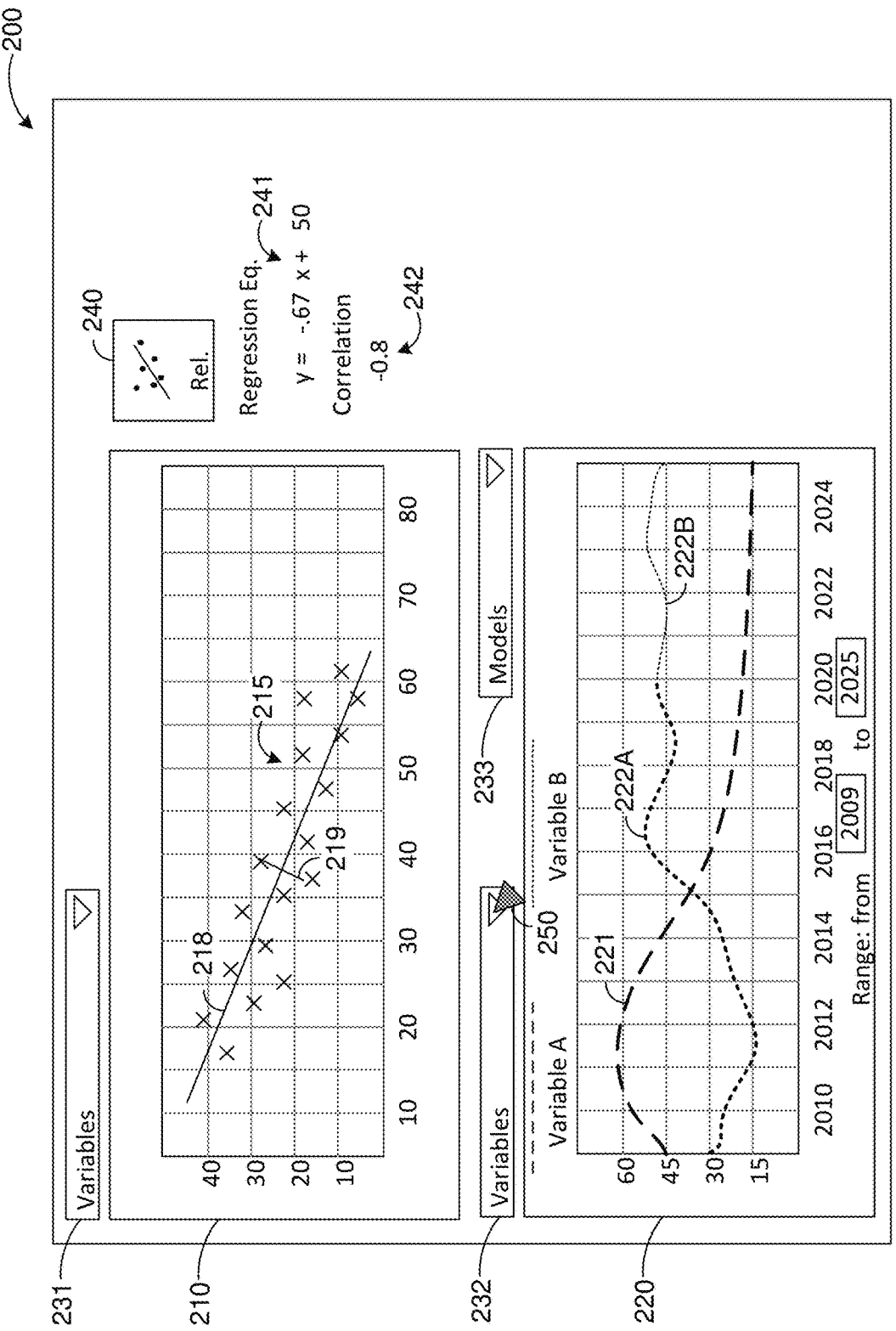
FIGS. 2A-2M illustrate example user interfaces for displaying modeled data in accordance with some embodiments.

FIG. 2A illustrates a user interface 200 including a first graphing area 210 and a second graphing area 220. The first graphing area 210 includes a plot 215 of a first set of data points for a first variable (e.g., Variable A) versus a first set of data points for a second variable (e.g., Variable B) in the form of a scatter plot. The first graphing area 210 includes two representations of relationships between the first variable and the second variance. The first graphing area 210 includes a regression line 218 indicative of a regression equation calculated based on the first set of data points for the first variable and the first set of data points for the second variable describing a regression relationship between the first variable and the second variable. In various implementations, the slope and intercept of the regression line 218 are the regression slope and regression intercept of the regression equation. The first graphing area 210 includes a correlation line 219 indicative of a correlation calculated based on the first set of data points for the first variable and the first set of data points for the second variable describing a correlation relationship indicative of the degree by which the first variable is dependent on the second variable (or vice versa). In various implementations, the correlation line 219 is perpendicular to the regression line 218 and has a length proportional to the calculated correlation. Although the term "correlation" is primarily used herein, it is to be appreciated that the correlation can include a covariance, a correlation coefficient (such as the Pearson correlation coefficient), mutual information, etc.

The second graphing area 220 includes, in the form of line plots, a plot 221 of the first set of data points for the first variable, a plot 222A of the first set of data points for the second variable, and a plot 222B of a second set of data points for the second variable. In various implementations, the first set of data points for the first variable and the first set of data points for the second variable represent stored data for the first variable and second variable (e.g., stored in the data store 120 of FIG. 1) and the second set of data points for the second variable represents modeled data for the second variable generated (e.g., by the modeling module 113 of FIG. 1) based on one or more models.

In various implementations, stored data is displayed differently than modeled data. For example, in FIG. 2A, the plot 221 of the first set of data points for the first variable and the plot 222A of the first set of data points for the second variable are displayed with a thicker line than the plot 222B of the second set of data points for the second variable.

The first graphing area 210 is associated with a first variable selection affordance 231 that, when selected, allows a user to select which variables are represented in the first graphing area 210. The second graphing area 220 is associated with second variable selection affordance 232 that, when selected, allows the user to select which variable (or set of variables) is represented in the second graphing area 220. The second graphing area 220 is also associated with model selection affordance 233 that, when selected, allows the user to select which model (or set of models) is used (e.g., by the modeling module 113 of FIG. 1) to generate modeled data, such as the second set of data points for the second variable represented by the plot 222B.

The user interface 200 includes a relationship affordance 240 that, when selected and as described further below, allows a user to change a relationship between a first variable and a second variable (at least as used, e.g., by the modeling module 113 of FIG. 1, in the modeling of data).

Below the relationship affordance 240, the user interface 200 includes a number of representations of relationships between the first variable and the second variable in the form of number affordances 241-242 that include a number, such as the regression slope (e.g., −0.67), the regression intercept (e.g., 50), and the correlation (e.g., −0.8).

The user interface 200 includes a cursor 250. FIG. 2A illustrates the cursor 250 at the location of the second variable selection affordance 232.

Figure 2B:
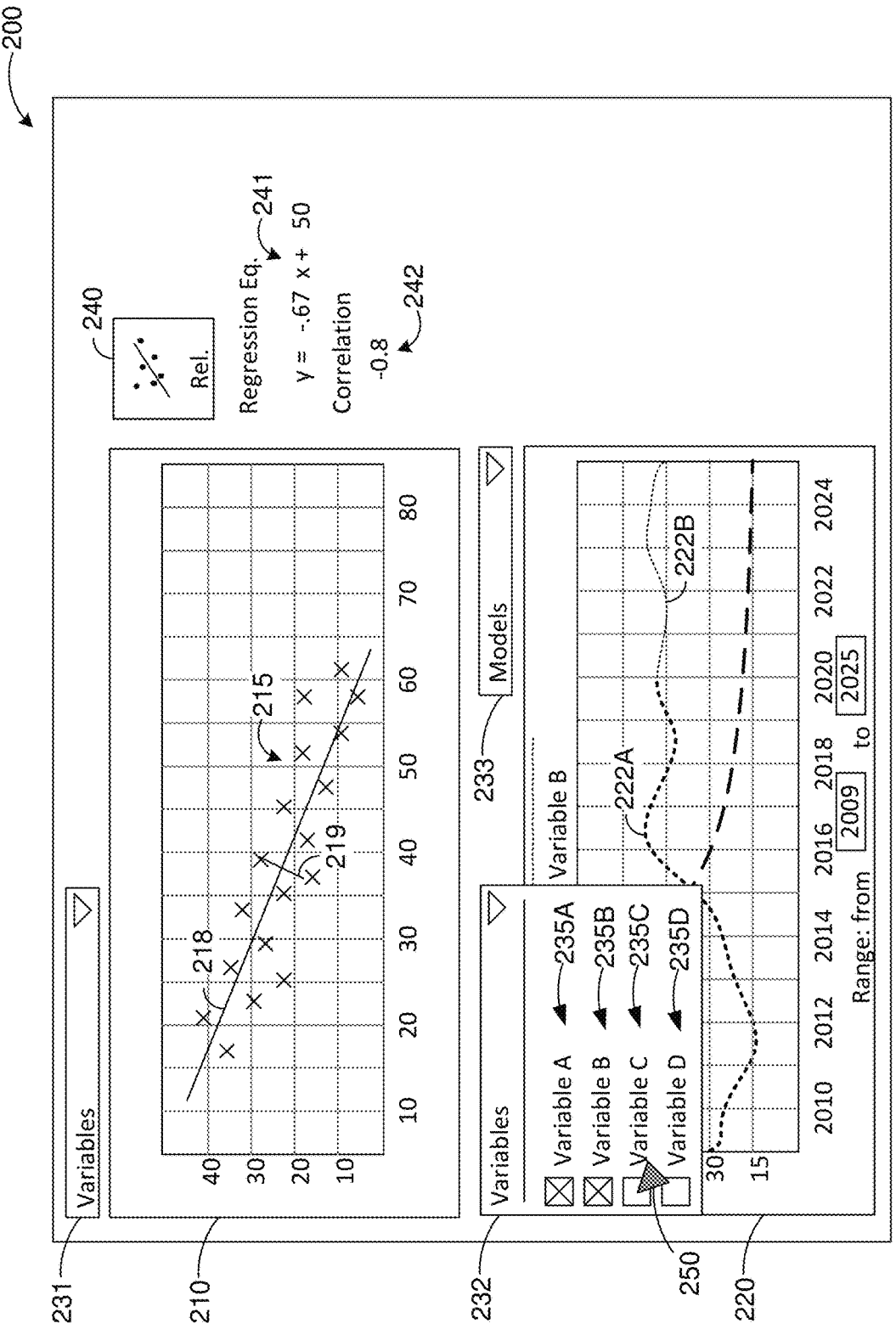

FIG. 2B illustrates the user interface 200 of FIG. 2A in response to detecting a user input corresponding to selection of the second variable selection affordance 232. In the user interface 200 of FIG. 2B, the second variable selection affordance 232 is expanded as a drop-down menu to include a plurality of variable display toggle affordances 235A-235D that, when selected, toggle display of a plot of data points for a respective variable.

FIG. 2B illustrates the cursor 250 at the location of a third variable display toggle affordance 235C of the plurality of variable display toggle affordances 235A-235D.

Figure 2C:
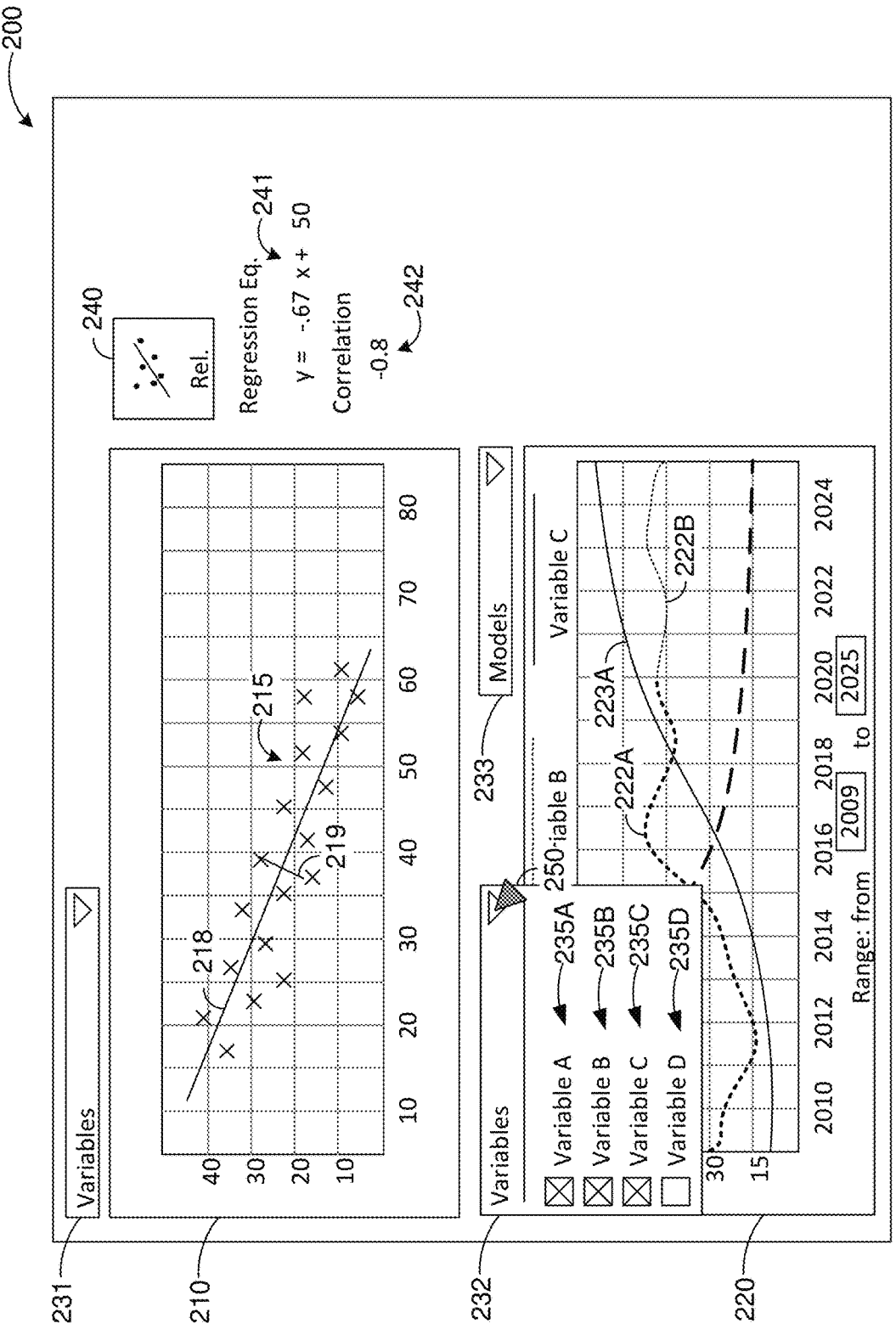

FIG. 2C illustrates the user interface 200 of FIG. 2B in response to detecting a user input corresponding to selection of the third variable display toggle affordance 235C. In the user interface 200 of FIG. 2C, the third variable display toggle affordance 235C is toggled (e.g., activated), resulting in the second graphing area 220 presenting a plot 223A of a set of data points for the third variable (e.g., Variable C). In various implementations, the set of data points for the third variable are generated according to a model (e.g., a first model) applied to the first set of data points for the first variable and the first set of data points for the second variable (and, optionally, additional data points for the first variable and/or second variable and/or data points for additional variables).

As noted above, in various implementations, stored data is displayed different than modeled data. For example, in FIG. 2C, the plot 222A of the first set of data points for the second variable is displayed with a thicker line than the plot 223A of the set of data points for the third variable.

FIG. 2C illustrates the cursor 250 at the location of the second variable selection affordance 232.

Figure 2D:
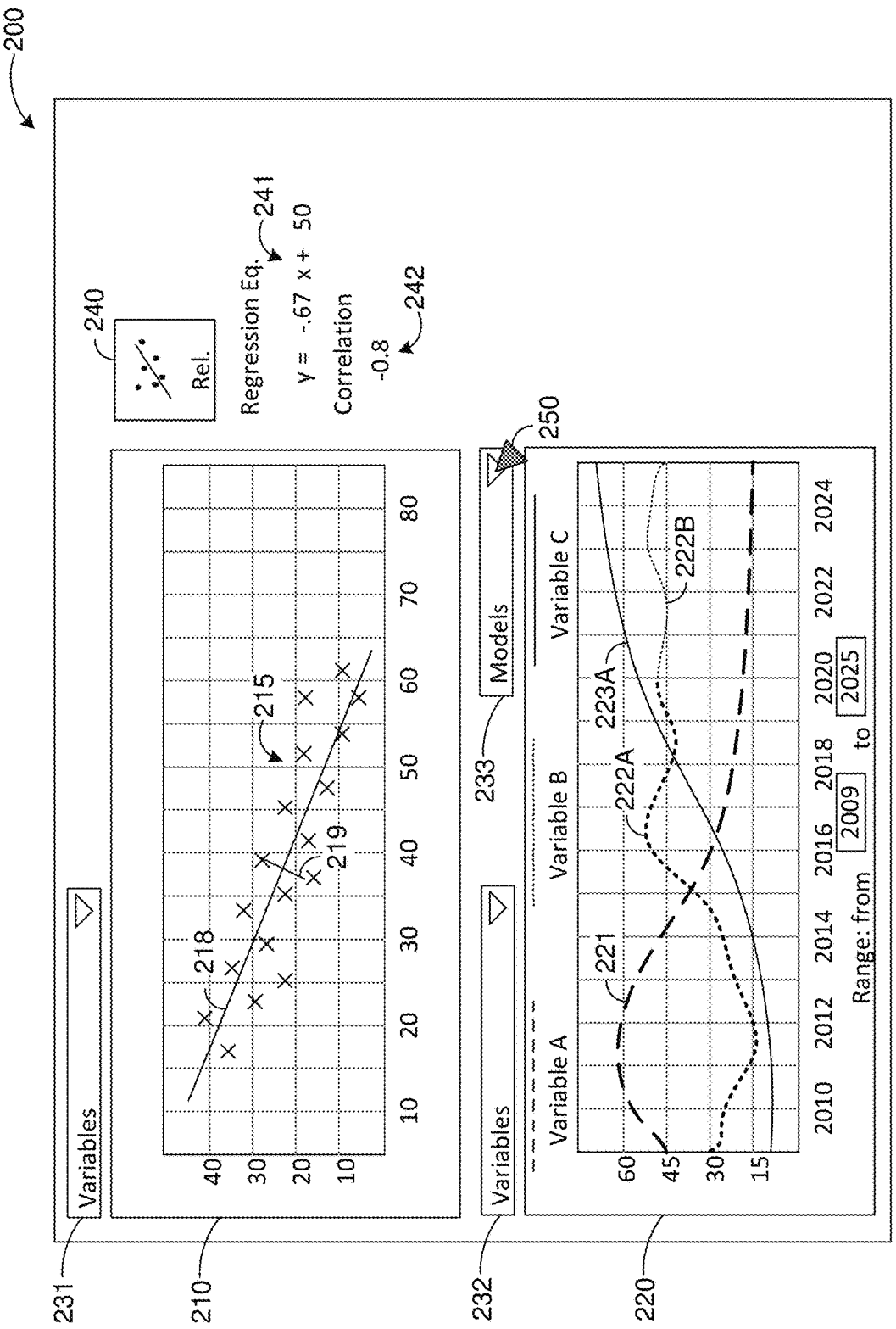

FIG. 2D illustrates the user interface 200 of FIG. 2C in response to detecting a user input corresponding to a selection of the second variable selection affordance 232. In the user interface 200 of FIG. 2D, the second variable selection affordance 232 is de-expanded to the state shown in FIG. 2A.

FIG. 2D illustrates the cursor 250 at the location of the model selection affordance 233.

Figure 2E:
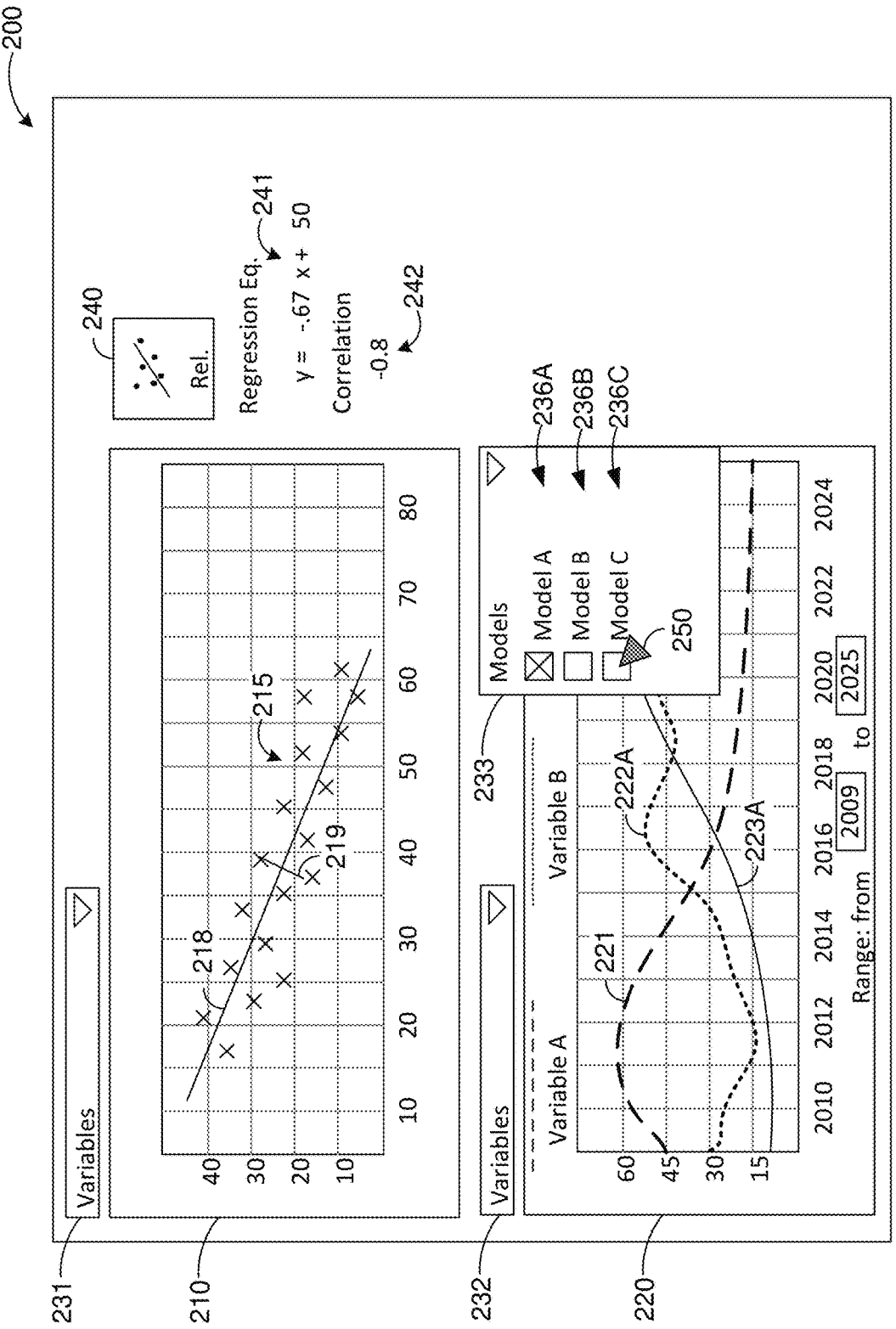

FIG. 2E illustrates the user interface 200 of FIG. 2D in response to detecting a user input corresponding to selection of the model selection affordance 233. In the user interface 200 of FIG. 2E, the model selection affordance 233 is expanded as a drop-down menu to include a plurality of model affordances 236A-236C that, when selected, specify a model used (e.g., by the modeling module 113 of FIG. 1) to generate the second set of data points for the second variable represented by the plot 222B and to generate the set of data points for the third variable represented by the plot 223A.

FIG. 2E illustrates the cursor 250 at the location of a third model affordance 236C of the plurality of model affordances 236A-236C.

Figure 2F:
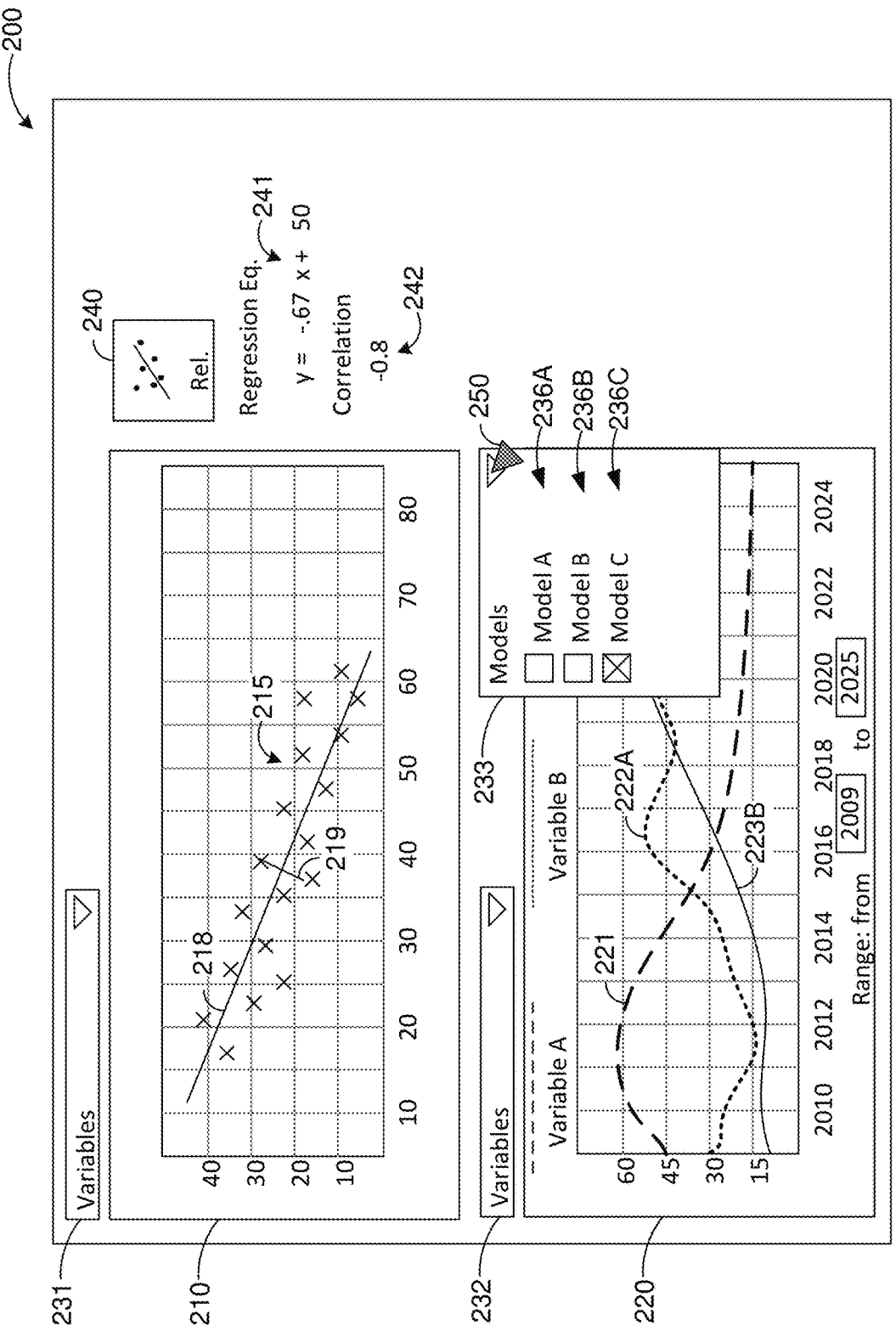

FIG. 2F illustrates the user interface 200 of FIG. 2E in response to detecting a user input corresponding to selection of the third model affordance 236C. In the user interface 200 of FIG. 2F, the third model affordance 236C is toggled (e.g., activated) and the first model affordance 236A is toggled (e.g. deactivated). In various implementations, multiple model affordances are simultaneously activated and multiple plots of the same variable (generated by different models) are displayed in the first graphing area 210 and/or the second graphing area 220. In the user interface 200 of FIG. 2F (although hidden by the model selection affordance 233), the plot 222B representing a second set of data points for the second variable generated according to the first model is replaced with a plot 222C representing a second set of data points for the second variable generated according to the third model applied to the first set of data points for the first variable and the first set of data points for the second variable (and, optionally, additional data points for the first variable and/or second variable and/or data points for additional variables). Similarly, the plot 223A representing a set of data points for the third variable generated according to the first model is replaced with a plot 223B representing a set of data points for the third variable generated according to the third model applied to the first set of data points for the first variable and the first set of data points for the second variable (and, optionally, additional data points for the first variable and/or second variable and/or data points for additional variables).

FIG. 2F illustrates the cursor 250 at the location of the model selection affordance 233.

Figure 2G:
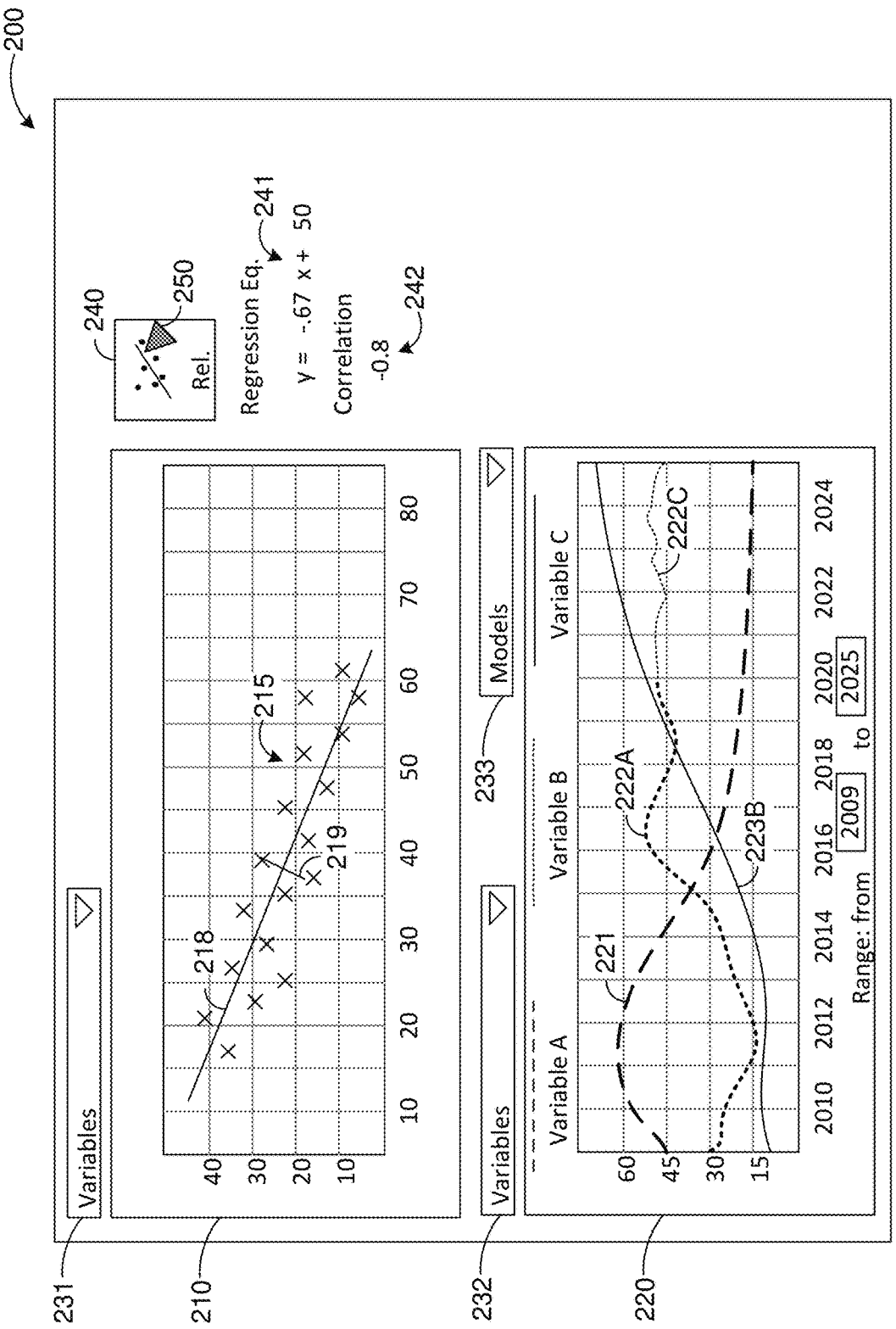

FIG. 2G illustrates the user interface 200 of FIG. 2F in response to detecting a user input corresponding to selection of the model selection affordance 233. In the user interface 200 of FIG. 2G, the model selection affordance 233 is de-expanded to the state shown in FIG. 2A.

FIG. 2G illustrates the cursor 250 at the location of the relationship affordance 240.

Figure 2H:
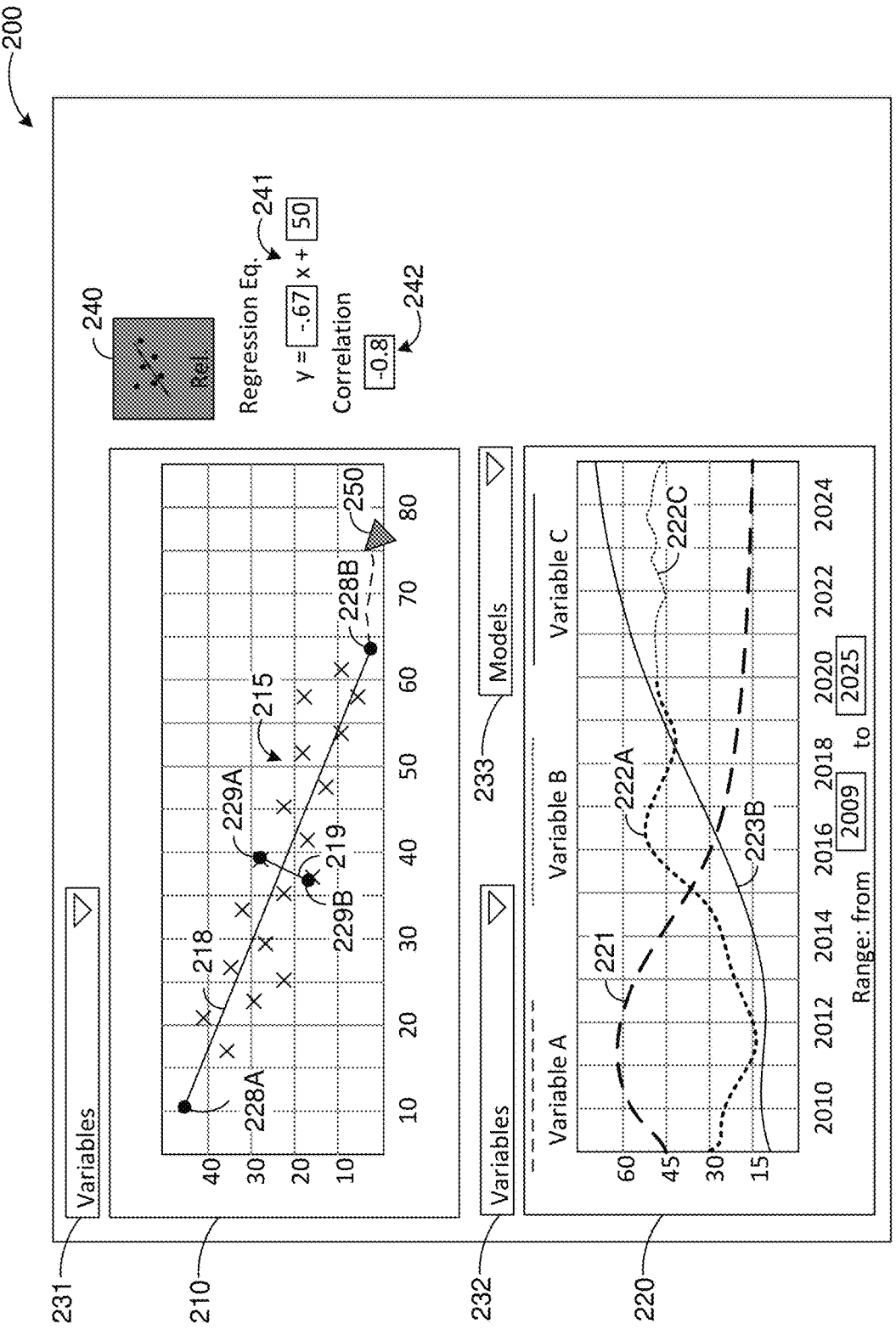

FIG. 2H illustrates the user interface 200 of FIG. 2G in response to detecting a user input corresponding to selection of the relationship affordance 240. In the user interface 200 of FIG. 2H, the relationship affordance 240 is changed to indicate that a relationship mode is activated.

In response to the relationship mode being activated, display of the number affordances 241-242 changes to indicate that the number affordances are selected and further user input (e.g., typing via a keyboard) can change the corresponding numbers.

Further, the user interface 200 includes a first regression line affordance 228A and a second regression line affordance 228B displayed at the ends of the regression line 218 and a first correlation line affordance 229A and a second correlation line affordance 229B displayed at the ends of the correlation line 219.

FIG. 2H illustrates the cursor 250 moving along a path within the first graphing area 210 from a first location of the second regression line affordance 228B to a second location.

Figure 2I:
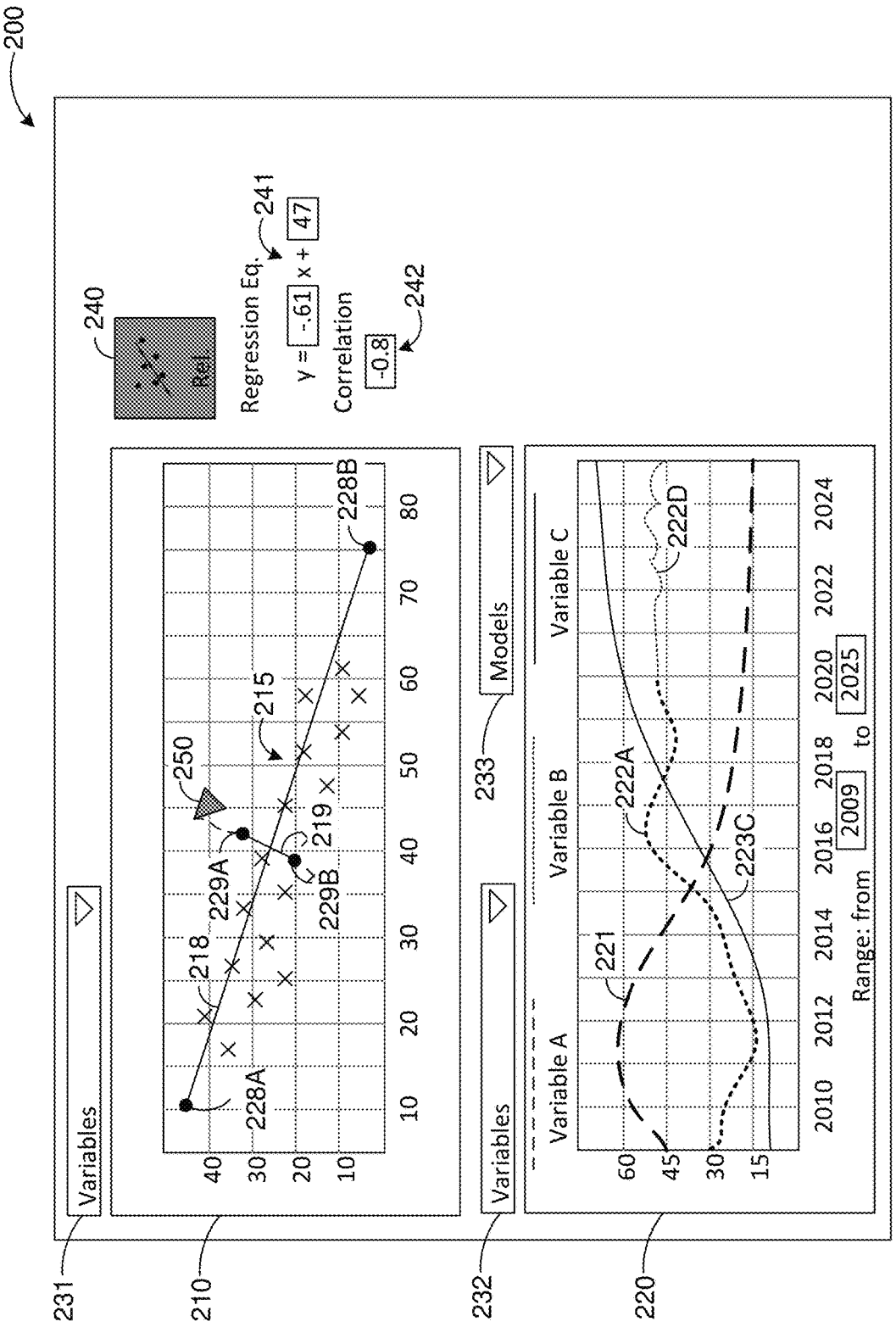

FIG. 2I illustrates the user interface 200 of FIG. 2H in response to detecting the cursor moving along the path within the first graphing area 210 from a first location of the second regression line affordance 228B to a second location. In FIG. 2I, the regression line 218 is changed in accordance with the movement of the cursor 250 and the correlation line 219 is changed in accordance with the change in the regression line 218. Further, the number affordances 241 display different numbers in accordance with change in the regression line 218.

Based on the change in the regression line 218, the plot 222C of the second set of data points for the second variable is replaced by a plot 222D of the second set of data points for the second variable based on the changed relationship (e.g., the changed regression equation) between the first variable and the second variable. Similarly, the plot 223B of the set of data points for the third variable is replaced by a plot 223C of the set of data points for the third variable based on the changed relationship (e.g., the changed regression equation) between the first variable and the second variable.

FIG. 2I illustrates the cursor 250 moving along a path within the first graphing area 210 from a first location of the first correlation line affordance 229A to a second location.

Figure 2J:
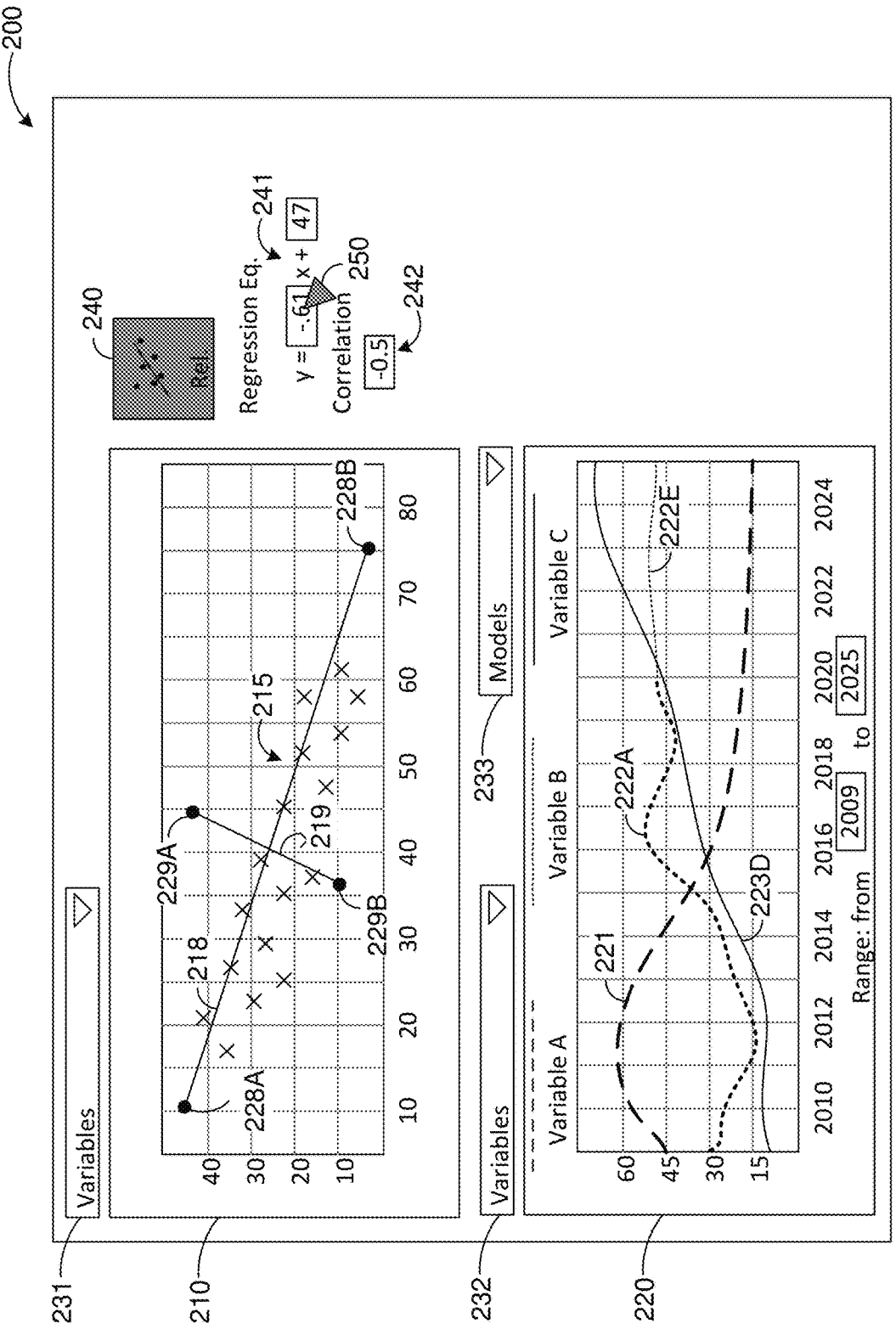

FIG. 2J illustrates the user interface 200 of FIG. 2I in response to detecting the cursor moving along the path within the first graphing area 210 from a first location of the first correlation line affordance 229A to a second location. In FIG. 2J, the correlation line 219 is changed in accordance with the movement of the cursor 250. Further, the number affordance 242 displays a different number in accordance with change in the correlation line 219.

Based on the change in the correlation line 219, the plot 222D of the second set of data points for the second variable is replaced by a plot 222E of the second set of data points for the second variable based on the changed relationship (e.g., the changed correlation) between the first variable and the second variable. Similarly, the plot 223C of the set of data points for the third variable is replaced by a plot 223D of the set of data points for the third variable based on the changed relationship (e.g., the changed correlation) between the first variable and the second variable.

FIG. 2J illustrates the cursor 250 at the location of the number affordance 241.

Figure 2K:
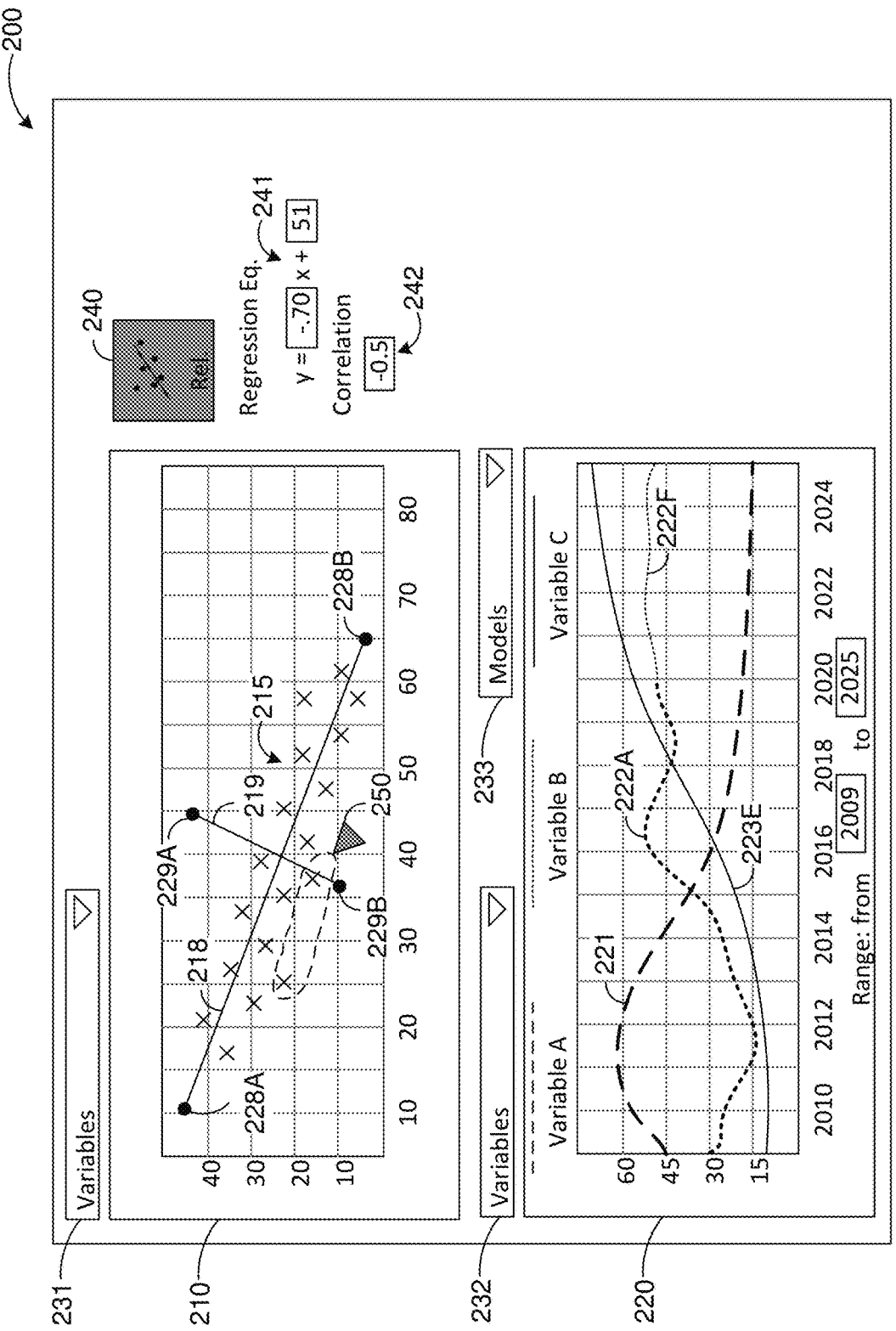

FIG. 2K illustrates the user interface 200 of FIG. 2J in response to detecting a user input corresponding to selection of the number affordance 241 and further user input (e.g., via a keyboard) indicating a regression slope of −0.70 and a regression intercept of 51. In FIG. 2K, the regression line 218 and correlation line 219 are changed in accordance with the values provided using the number affordance 241.

Based on the change in the regression line 218 and the correlation line 219, the plot 222E of the second set of data points for the second variable is replaced by a plot 222F of the second set of data points for the second variable based on the changed relationship (e.g., the changed regression equation) between the first variable and the second variable. Similarly, the plot 223D of the set of data points for the third variable is replaced by a plot 223E of the set of data points for the third variable based on the changed relationship (e.g., the changed regression equation) between the first variable and the second variable.

FIG. 2K illustrates the cursor 250 moving along a path within the first graphing area 210 enclosing two plot points of the plot 215.

Figure 2L:
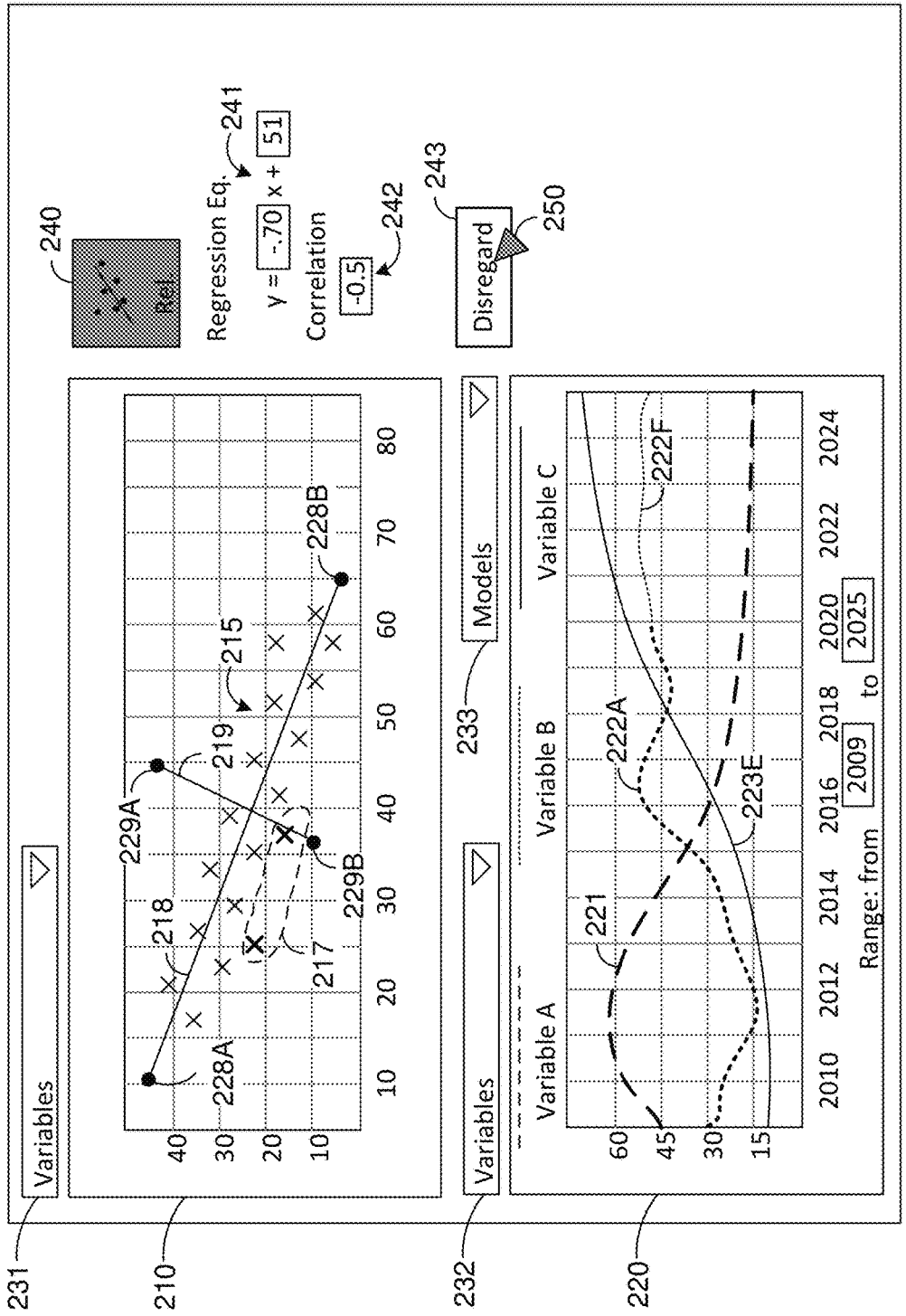

FIG. 2L illustrates the user interface 200 of FIG. 2K in response to detecting movement of the cursor 250 along the path within the first graphing area 210 enclosing the two plot points of the plot 215. In FIG. 2L, a selection indicator 217 is displayed indicating the selection of the two plot points (which are also displayed differently, e.g., bolded) and the user interface 200 includes a disregard affordance 243 that, when selected, recalculates the relationships between the first variable and the second variable without accounting for the selected plot points. In various implementations, the disregard affordance 243 is replaced and/or supplemented by a weighting affordance that, when selected and provided with a new weighting, recalculates relationships between the first variable and the second variable with the new weighting of the selected plot points.

FIG. 2L illustrates the cursor 250 at the location of the disregard affordance 243.

Figure 2M:
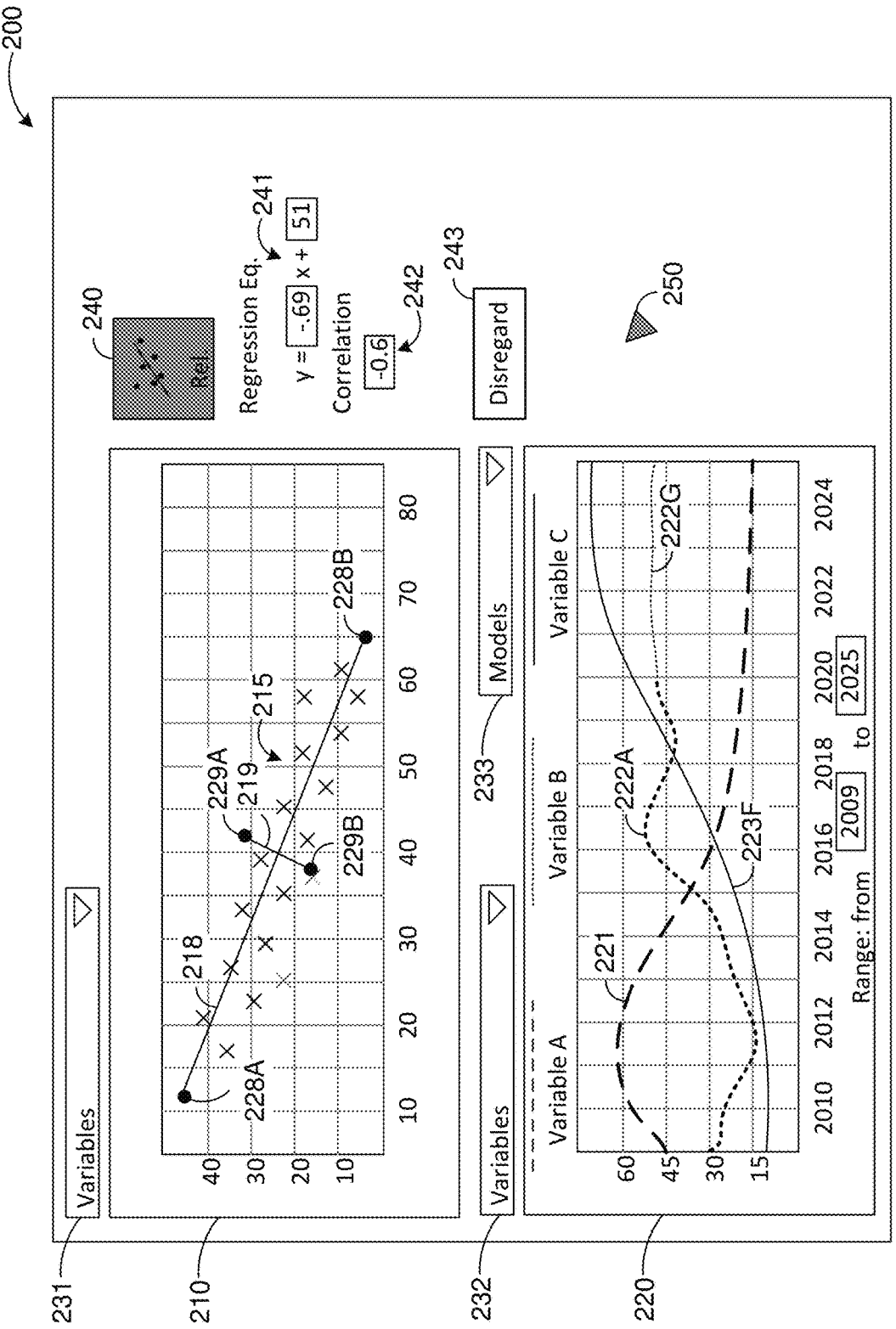

FIG. 2M illustrates the user interface 200 of FIG. 2L in response to detecting a user input corresponding to selection of the disregard affordance 243. In FIG. 2M, the representations of the relationships between the first variable and the second variable (e.g., the regression line 218, the correlation line 219, and the number affordances 241-242) are changed to indicate relationships between the first variable and the second variable calculated without accounting for (e.g., ignoring or disregarding) the selected plot points. Further, the plot points are displayed differently (e.g., grayed out) to indicate that the plot points were not used in calculation of the representations of the relationships between the first variable and the second variable.

Based on the change in the regression line 218 and the correlation line 219, the plot 222F of the second set of data points for the second variable is replaced by a plot 222G of the second set of data points for the second variable based on the changed relationships (e.g., the changed regression equation and correlation) between the first variable and the second variable. Similarly, the plot 223E of the set of data points for the third variable is replaced by a plot 223F of the set of data points for the third variable based on the changed relationships (e.g., the changed regression equation and correlation) between the first variable and the second variable.

Figure 3:
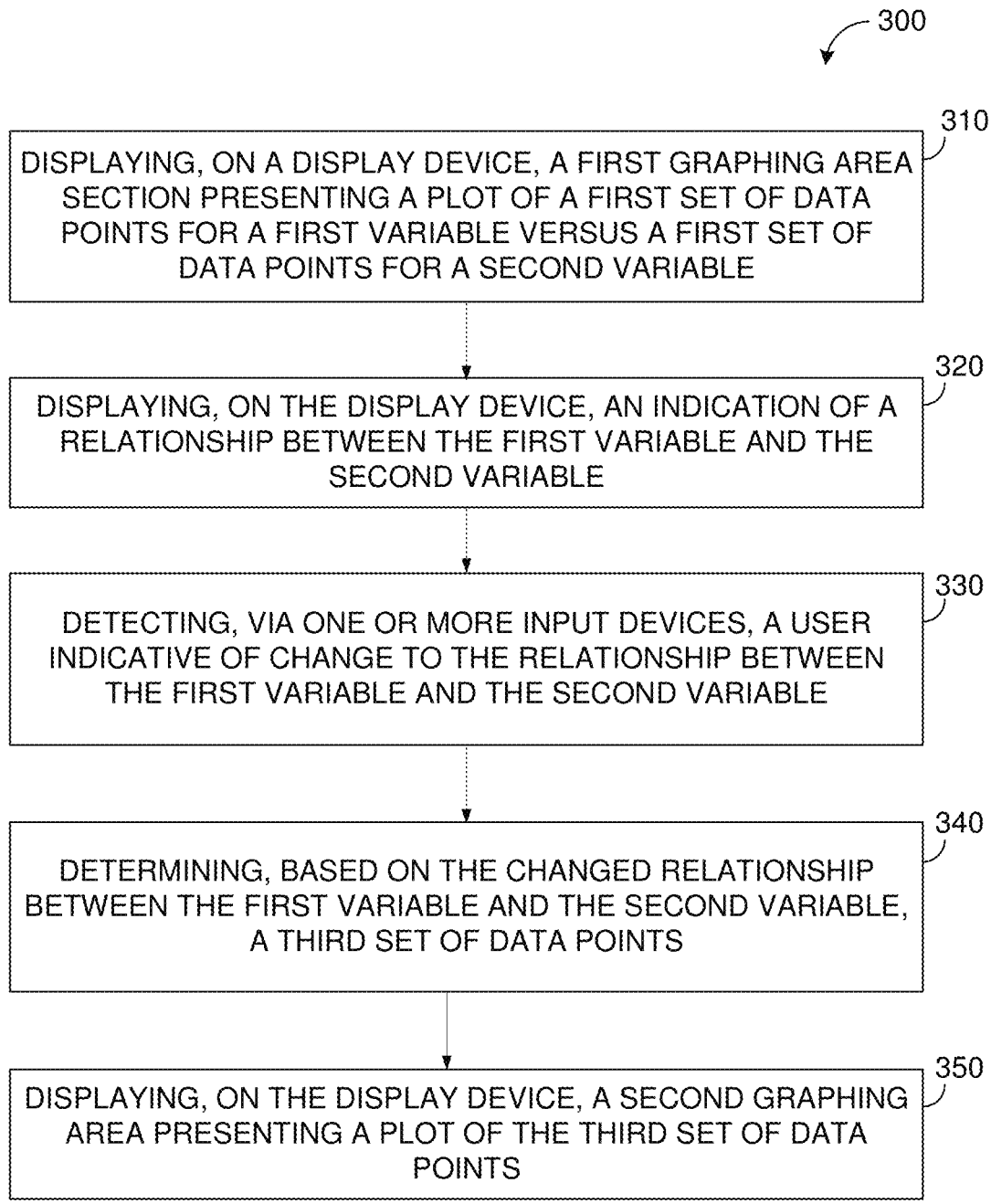
FIG. 3 is a flowchart representation of a method of displaying modeled data in accordance with some embodiments.

FIG. 3 is a flowchart representation of a method 300 of displaying modeled data in accordance with some embodiments. In some embodiments (and as detailed below as an example), the method 300 is performed by modeling system, such as the modeling system 100 of FIG. 1, or a portion thereof. In some embodiments, the method 300 is performed by an electronic device with a display device and one or more input devices. In some embodiments, the method 300 is performed by processing logic, including hardware, firmware, software, or a combination thereof. In some embodiments, the method 300 is performed by a processor executing code stored in a non-transitory computer-readable medium (e.g., a memory).

The method 300 begins, in block 310, with the modeling system displaying, on the display device, a first graphing area presenting a plot of a first set of data points for a first variable versus a first set of data points for a second variable. In various implementations, displaying the first graphing area includes displaying a scatter plot. For example, in FIG. 2A, the user interface 200 includes the first graphing area 210 presenting the plot 215 of a first set of data points for the first variable versus a first set of data points for the second variable in the form of a scatter plot.

In various implementations, the first set of data points for the first variable (and the first set of data points for the second variable) the first represents the value of a variable over time. Thus, in various implementations, each of the first set of data points for the first variable (and each of the first set of data points for the second variable) includes a first value (e.g., a time value) and a corresponding second value (e.g., a variable value). In various implementations, the first set of data points for the first variable (and/or the second set of data points for the second variable) represents, for example only, a population over time, a communications network bandwidth over time, a cost over time, a drug efficacy over time, or a user biometric over time.

The method 300 continues, in block 320, with the modeling system displaying, on the display device, an indication of a relationship between the first variable and the second variable. In various implementations, displaying the indication of the relationship between the first variable and the second variable includes displaying a regression line in the first graphing area. For example, in FIG. 2A, the user interface 200 includes the regression line 218 indicative of a regression equation calculated based on the first set of data points for the first variable and the second set of data points for the second variable describing a regression relationship between the first variable and the second variable. In various implementations, displaying the indication of the relationship between the first variable and the second variable includes displaying a correlation line in the first graphing area. For example, in FIG. 2A, the user interface 200 includes the correlation line 219 indicative of a correlation calculated based on the first set of data points for the first variable and the second set of data points for the second variable describing a correlation relationship indicative of the degree by which the first variable is dependent on the second variable (or vice versa). In various implementations, displaying the indication of the relationship between the first variable and the second variable includes displaying a number affordance including a number. For example, in FIG. 2A, the user interface 200 includes the number affordances 241-242 that include a number, such as the regression slope (e.g., −0.67), the regression intercept (e.g., 50), and the correlation (e.g., −0.8).

The method 300 continues, in block 330, with the modeling system detecting, via the one or more input devices, a user input indicative of a change to the relationship between the first variable and the second variable. In various implementations, detecting the user input indicative of a change to the relationship between the first variable and the second variable includes detecting a user input moving from a first location within the first graphing area section to a second location within the first graphing area. In various implementations, detecting the user input includes detecting movement of a mouse, while a mouse button is clicked, to effect movement of a corresponding cursor along a path from the first location to the second location. In various implementations, detecting the first user input includes detecting contact (e.g., of a finger or a stylus) on a touch-sensitive surface moving along a path from the first location to the second location.

In various implementations, detecting the user input indicative of change to the relationship between the first variable and the second variable includes detecting a user input moving from a first location of the regression line to a second location. For example, in FIG. 2H, the cursor 250 moves from a first location of the second regression line affordance 228B at the end of the regression line 218 to a second location.

In various implementations, detecting the user input indicative of change to the relationship between the first variable and the second variable includes detecting a user input moving from a first location of the correlation line to a second location. For example, in FIG. 2I, the cursor 250 moves from a first location of the first correlation line affordance 229A at the end of the correlation line 219 to a second location.

In various implementations, detecting the user input indicative of change to the relationship between the first variable and the second variable includes detecting a user input corresponding to a selection of the number affordance. For example, in FIG. 2J, the cursor 250 is displayed at the location of the number affordance 241.

In various implementations, detecting the user input indicative of change to the relationship between the first variable and the second variable includes detecting a user input corresponding to a selection of a portion of the first set of data points for the first variable and the first set of data points for a second variable to be disregarded. For example, in FIG. 2K, the cursor 250 moves along a path within the first graphing area 210 enclosing two plot points of the plot 215.

In some embodiments, the method 300 includes detecting, via the one or more input devices, a user input corresponding to a selection of a relationship affordance that, when selected, activates a relationship mode and detecting the user input (in block 330) indicative of change to the relationship between the first variable and the second variable is performed in response to determining that a relationship mode is active. For example, in FIG. 2G, the cursor 250 is displayed at the location of the relationship affordance 240 that, when selected, activates a relationship mode. In various implementations, the modeling system performs the steps of block 330, 340, and 350 in response to detecting that a relationship mode is activated.

The method 300 continues, in block 340, with the modeling system determining, based on the changed relationship between the first variable and the second variable, a second set of data points. In various implementations, determining the second set of data points is further based on the first set of data points for the first variable and the first set of data points for the second variable. For example, in various implementations, the modeling system generates the second set of data points by applying a model to at least the first set of data points for the first variable and the first set of data points for the second variable. In various implementations, the modeling system applies the model to other sets of data points for the first variable, second variable, or other variables. In various implementations, the model includes an equation (e.g., a regression equation) including coefficients and defining a functional relationship between the first variable and the second variable and the change in the relationship between the first variable and the second variable changes the coefficients. In various implementations, the model includes a relationship coefficient (e.g., a correlation) for the first variable and the second variable and the change in the relationship between the first variable and the second variable correspondingly changes the relationship coefficient.

In various implementations, determining the second set of data points includes determining a second set of data points for the second variable. For example, in FIG. 2I, the second graphing area 220 includes the plot 222D of the second set of data points for the second variable. In various implementations, determining the second set of data points includes determining a set of data points for a third variable. For example, in FIG. 2I, the second graphing area 220 includes the plot 223C of the set of data points for the third variable. In various implementations, the method 300 includes detecting, via the one or more input devices, a user input corresponding to selection of the third variable and displaying the second graphing area section (as described below with respect to block 350) is performed in response to detecting the user input corresponding to selection of the third variable. For example, in FIG. 2C, the user interface 200 includes the third variable display toggle affordance 235C activated in response to a user input corresponding to selection of the third variable display toggle affordance 235C.

The method 300 continues, in block 350, with the modeling system displaying, on the display device, a second graphing area presenting a plot of the second set of data points. In various implementations, displaying the second graphing area includes displaying a line plot. For example, in FIG. 2I, the second graphing area 220 includes the plot 222D of the second set of data points for the second variable and the plot 223C of the set of data points for the third variable in the form of line plots.

Figure 4:
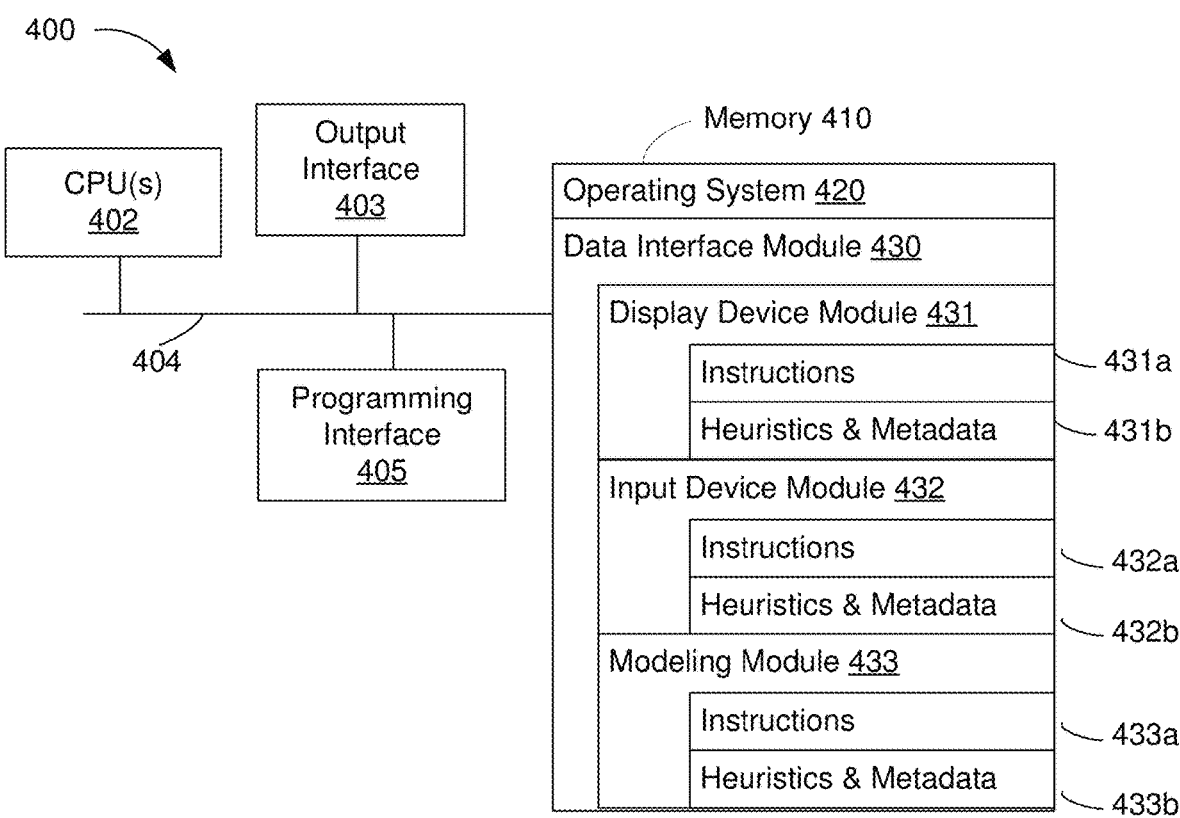
FIG. 4 is a block diagram of an example device in accordance with some embodiments.

FIG. 4 is a block diagram of an example device 400 in accordance with some embodiments. In some embodiments, the device corresponds to the modeling system 100 of FIG. 1 and performs one or more of the functionalities described above with respect to that system. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 400 includes one or more processing units (CPU(s)) 402 (e.g., processors), one or more output interfaces 403 (e.g., a network interface), a memory 410, a programming interface 405, and one or more communication buses 404 for interconnecting these and various other components.

In some embodiments, the communication buses 404 include circuitry that interconnects and controls communications between system components. The memory 410 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 410 optionally includes one or more storage devices remotely located from the CPU(s) 402. The memory 410 comprises a non-transitory computer readable storage medium. Moreover, in some embodiments, the memory 410 or the non-transitory computer readable storage medium of the memory 410 stores the following programs, modules and data structures, or a subset thereof including an optional operating system 420 and a data interface module 430 including a display device module 431, an input device module 432, and a modeling module 433. In some embodiments, one or more instructions are included in a combination of logic and non-transitory memory. The operating system 420 includes procedures for handling various basic system services and for performing hardware dependent tasks.

In some embodiments, the display device module 431 is configured to display, on a display device, a first graphing area section presenting a plot of a first set of data points for a first variable versus a first set of data points for a second variable. To that end, the display device module 431 includes a set of instructions 431a and heuristics and metadata 431b. In some embodiments, the display device module 431 is further configured to display, on the display device, an indication of a relationship between the first variable and the second variable.

In some embodiments, the input device module 432 is configured to detect, via one or more input devices, a user input indicative of a change to the relationship between the first variable and the second variable. To that end, the input device module 432 includes a set of instructions 432a and heuristics and metadata 432b.

In some embodiments, the modeling module 433 is configured to determine, based on the change to the relationship between the first variable and the second variable, a second set of data points. To that end, the modeling module 433 includes a set of instructions 433a and heuristics and metadata 433b.

In some embodiments, the display device module 431 is further configured to display, on the display device, a second graphing area presenting a plot of the second set of data points.

Although the display device module 431, the input device module 432, and the modeling module 433 are illustrated as residing on a single device 400, it should be understood that in other embodiments, any combination of the display device module 431, the input device module 432, and the modeling module 433 can reside in separate devices. For example, in some embodiments, each of the display device module 431, the input device module 432, and the modeling module 433 reside in a separate device.

Moreover, FIG. 4 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device with a display device and one or more input devices:
displaying, on the display device, a first graphing area presenting a plot of a first set of data points for a first variable versus a first set of data points for a second variable;
displaying, on the display device within the first graphing area, an indication of a relationship between the first variable and the second variable;
detecting, via the one or more input devices, a user input moving from a first location of the indication to a second location to define a change to the relationship between the first variable and the second variable;
determining, based on the change to the relationship between the first variable and the second variable, a second set of data points; and
displaying, on the display device, a second graphing area presenting a plot of the second set of data points.

2. The method of claim 1, wherein displaying the indication includes displaying a regression line.

3. The method of claim 2, wherein detecting the user input includes detecting a user input moving from a first location of the regression line to the second location.

4. The method of claim 1, wherein displaying the indication displaying a correlation line.

5. The method of claim 4, wherein detecting the user input includes detecting a user input moving from a first location of the correlation line to the second location.

6. The method of claim 1, wherein determining the second set of data points includes determining a second set of data points for the second variable.

7. The method of claim 1, wherein determining the second set of data points includes determining a set of data points for a third variable.

8. The method of claim 7, further comprising detecting, via the one or more input devices, a user input corresponding to a selection of the third variable, wherein displaying the second graphing area presenting a plot of the third set of data points is performed in response to detecting the user input corresponding to a selection of the third variable.

9. The method of claim 1, wherein determining the second set of data points is further based on the first set of data points for the first variable and the first set of data points for the second variable.

10. The method of claim 1, wherein displaying the first graphing area includes displaying a scatter plot and displaying the second graphing area includes displaying a line plot.

11. The method of claim 1, further comprising detecting, via the one or more input devices, a user input corresponding to a selection of a relationship affordance that, when selected, activates a relationship mode, wherein detecting the user input is performed in response to determining that the relationship mode is active.

12. An electronic device comprising:
a display device;
one or more input devices; and
one or more processors configured to:
displaying, on the display device, a first graphing area presenting a plot of a first set of data points for a first variable versus a first set of data points for a second variable;
displaying, on the display device within the first graphing area, an indication of a relationship between the first variable and the second variable;
detecting, via the one or more input devices, a user input moving from a first location of the indication to a second location to define a change to the relationship between the first variable and the second variable;
determining, based on the change to the relationship between the first variable and the second variable, a second set of data points; and
displaying, on the display device, a second graphing area presenting a plot of the second set of data points.

13. The electronic device of claim 12, wherein the one or more processors are configured to display the indication by displaying a regression line and to detect the user input by detecting a user input moving from a first location of the regression line to the second location.

14. The electronic device of claim 12, wherein the one or more processors are configured to display the indication by displaying a correlation line and to detect the user input by detecting a user input moving from a first location of the correlation line to the second location.

15. The electronic device of claim 12, wherein the one or more processors are further configured to detect, via the one or more input devices, a user input corresponding to a selection of a relationship affordance that, when selected, activates a relationship mode, wherein the one or more processors are configured to detect the user input in response to determining that the relationship mode is active.

16. A non-transitory computer-readable medium encoding instructions which, when executed by a processor of an electronic device including a display device and one or more input devices, causes the electronic device to:
display, on the display device, a first graphing area presenting a plot of a first set of data points for a first variable versus a first set of data points for a second variable;
display, on the display device within the first graphing area, an indication of a relationship between the first variable and the second variable;
detect, via the one or more input devices, a user input moving from a first location of the indication to a second location to define a change to the relationship between the first variable and the second variable;
determine, based on the change to the relationship between the first variable and the second variable, a second set of data points; and
display, on the display device, a second graphing area presenting a plot of the second set of data points.

* * * * *